United States Patent [19]
Purdham et al.

[11] Patent Number: 4,918,696
[45] Date of Patent: Apr. 17, 1990

[54] BANK INITIATE ERROR DETECTION

[75] Inventors: David M. Purdham, Brooklyn Park; James H. Scheuneman, St. Paul, both of Minn.

[73] Assignee: Unisys Corporation, Blue Bell, Pa.

[21] Appl. No.: 245,600

[22] Filed: Sep. 19, 1988

[51] Int. Cl.⁴ ............................................. G06F 11/00
[52] U.S. Cl. .................................... 371/57.1; 364/900
[58] Field of Search .......................................... 371/57; 364/200 MS File, 900 MS File; 365/201, 189.01

[56] References Cited

U.S. PATENT DOCUMENTS

| 4,467,419 | 8/1984 | Wakai | 364/200 |
| 4,558,429 | 12/1985 | Barlow et al. | 364/900 |
| 4,654,788 | 3/1987 | Boudreau et al. | 364/200 |

Primary Examiner—Charles E. Atkinson
Attorney, Agent, or Firm—Glenn W. Bowen; Robert S. Bramson

[57] ABSTRACT

A multibank computer memory system is provided in which the storage banks monitor the initiate line while each bank operation is being processed to verify that another initiate is not received before it can be processed. This serves to check that the control logic is not in error, and that there is no error between the control section and the banks.

2 Claims, 1 Drawing Sheet

BANK INITIATE ERROR DETECTION

BACKGROUND OF THE INVENTION

In previous computer memory systems, when a storage bank received an Initiate signal from the control section, the storage bank would ignore any other Initiate signal until it was done with the first operation. As a result of this, if an error occurred in the control, and a second Initiate signal was sent to the bank before the bank was ready, the error would be ignored until the bank was done with the first operation.

SUMMARY OF THE INVENTION

The present invention provides for detection of a second request to a computer bank before the bank is able to accept it by allowing memory banks to continue to monitor the initiate line while performing a storage operation. The initiate line is checked during operations so that errors in the bank initiate logic can be detected sooner and reported earlier than they would be with previous computer memory systems.

DESCRIPTION OF THE INVENTION

Figure 1:
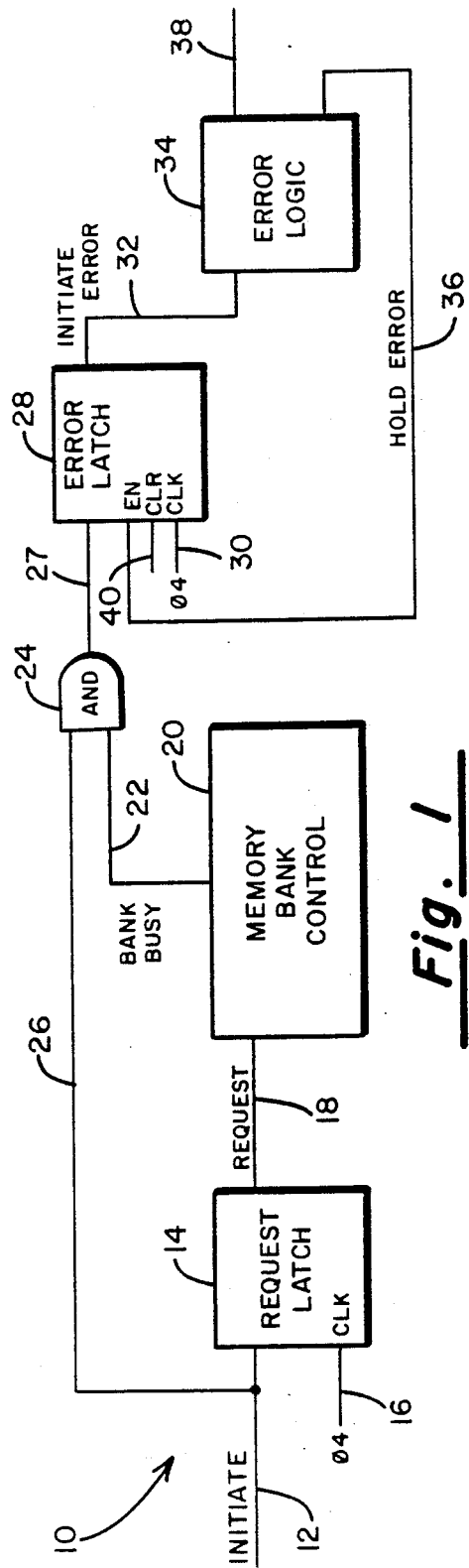
FIG. 1 shows a block diagram of the bank initiate error detection system of the present invention.

FIG. 1 illustrates a block diagram of the Bank Initiate Error Detection Section 10 of a multibank computer memory system. When a memory bank (not shown) is activated in the system in response to an Initiate signal from a processor, the Initiate signal is supplied on the line 12 to the input of the clocked Request Latch 14. The latch is clocked by a clock of a particular phase, (for example, phase 4, or $\phi 4$, of a four phase clock), on the line 16. The Request signal from the Latch 14 is supplied on the line 18 to the memory bank Controller 20. By reference to FIG. 2, it is seen that logic levels of the Request signal follow the logic levels of the Initiate signal. The Initiate signal is shown as going low to high on clock phase $\phi 1$. The Request signal goes low to high on $\phi 4$. The Initiate signal drops from high to low on the next $\phi 1$, and the Request signal does likewise on the following $\phi 4$.

Figure 2:
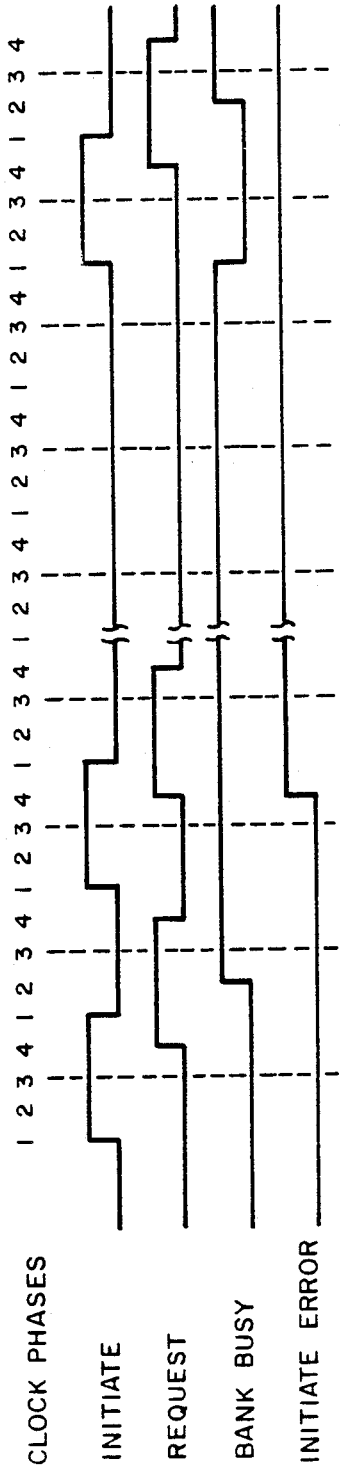
FIG. 2 is a timing diagram of various signals identified in FIG. 1.

The Memory Bank Controller may be of known design and is used to control the operation of the memory banks by providing control signals, such as a Bank Busy, on the line 22. As seen in FIG. 2, the Bank Busy signal goes low to high on the first $\phi 2$ clock pulse after the $\phi 4$ clock pulse that caused the first Request signal to go from low to high. The Bank Busy signal remains high, or active, as long as the operation that was initiated by the Initiate signal is in process. After the operation is completed, the bank Busy signal drops from high to low.

The Bank Busy signal is supplied to one input of AND gate 24, and the other input is supplied the Initiate signal on the line 26. The output of the AND gate which signifies the concurrent, or overlapping, existence of the Bank Busy and Initiate signals is supplied on the line 27 to the Error Latch 28. This occurs when a second Initiate signal occurs before the memory operation of the computer associated with the process of the first Initiate signal has been completed. The Error Latch 28, like the Request Latch 14, is clocked with a $\phi 4$ clock phase on the line 30.

The Error Latch 28 supplies an initiate Error signal on the line 32 to the Error Logic 34 when this signal is active to signify an initiate error has occurred. The error logic provides a Hold Error signal on the line 36 to the Error Latch 28 to hold the error in this latch. An indication that an error has occurred may be supplied to an error processing section of the computer system on the line 38. The error processing sections of the computer can then send a clear signal back to the Error Latch 28 on the line 40 after the error has been analyzed and/or corrected, which allows the Error Logic 34 to release the Hold Error enable signal on the line 36.

While a particular embodiment of the present invention has been described with illustrative logic circuitry, the present invention extends beyond the scope of the particular described implementation, as defined in appended claims, and it may be implemented in various versions which will be readily apparent to persons skilled in the art after this invention has been revealed to them.

What is claimed is:

1. A bank initiate error detection system for a multibank computer memory system wherein each of said banks of said multibank system comprises, control means responsive to initiate signals for said associated bank for providing a bank busy control signal for said associated bank following an initiate signal to said control means which has initiated a memory operation in said bank, wherein said bank busy signal persists until said memory operation is completed, error initiate means responsive to said associated initiate signals and to said associated bank busy signals for generating initiate error signals when both signals are present, and error means responsive to said associated initiate error signals for indicating when an initiate error occurs due to a second initiate signal being received by said associated bank before the operation associated with a first initiate signal for said associated bank has been completed.

2. A bank initiate error detection system as claimed in claim 1 wherein said error initiate means comprises error latch means and said error means provides a hold error enable signal to said error latch means upon the receipt of said second initiate signal to enable said error latch means to maintain an indicated initiate error signal until said hold error enable signal is terminated.

* * * * *